United States Patent
Onodera et al.

(10) Patent No.: US 11,212,352 B2
(45) Date of Patent: Dec. 28, 2021

(54) SHARING SYSTEM, METHOD, AND MANAGEMENT SERVER

(71) Applicant: TOYOTA JIDOSHA KABUSHIKI KAISHA, Toyota (JP)

(72) Inventors: Aya Onodera, Nisshin (JP); Akihiko Nakanishi, Nisshin (JP); Takumi Hamajima, Osaka (JP); Yusuke Tsutsui, Gifu-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/183,976

(22) Filed: Nov. 8, 2018

(65) Prior Publication Data

US 2019/0149621 A1 May 16, 2019

(30) Foreign Application Priority Data

Nov. 13, 2017 (JP) .............................. JP2017-218343

(51) Int. Cl.
*H04L 29/08* (2006.01)
*G06Q 50/30* (2012.01)
(Continued)

(52) U.S. Cl.
CPC ............. *H04L 67/16* (2013.01); *G06Q 10/02* (2013.01); *G06Q 30/00* (2013.01); *G06Q 30/02* (2013.01);
(Continued)

(58) Field of Classification Search
CPC ....... H01L 9/3247; H01L 9/30; H01L 9/3236; H01L 63/0815; H01L 63/0861;
(Continued)

(56) References Cited

U.S. PATENT DOCUMENTS

2009/0157627 A1* 6/2009 Arthursson ............. G06F 9/455
2013/0086652 A1* 4/2013 Kavantzas ............ G06F 21/335
726/5

(Continued)

FOREIGN PATENT DOCUMENTS

JP         2011186766 A    9/2011
JP         2012215922 A    11/2012
JP         2017-102553 A   6/2017

*Primary Examiner* — Djenane M Bayard
(74) *Attorney, Agent, or Firm* — Hunton Andrews Kurth LLP

(57) ABSTRACT

A car sharing system includes a first server configured to manage a first sharing service, a second server configured to manage a second sharing service, and a management server configured to manage virtual user IDs. When a user has performed utilization registration for the first sharing service only, the user makes, to the first server, utilization application for the second sharing service operated by another business operator, from a communication terminal. The first server which has received the utilization application transmits user information to the management server. When the management server receives the user information, the management server allocates the user information to a virtual user ID, and notifies the second server of allocation information. The second server provides the second sharing service using the virtual user ID to which the user information is allocated.

8 Claims, 6 Drawing Sheets

(51) Int. Cl.
   *G06Q 30/06*   (2012.01)
   *G06Q 30/02*   (2012.01)
   *G06Q 30/00*   (2012.01)
   *G06Q 10/02*   (2012.01)

(52) U.S. Cl.
   CPC ......... *G06Q 30/0645* (2013.01); *G06Q 50/30* (2013.01); *H04L 67/10* (2013.01); *H04L 67/325* (2013.01)

(58) Field of Classification Search
   CPC ....... H01L 9/3213; H01L 63/18; H01L 67/12; H01L 9/3231; H01L 2209/34; H01L 2209/76; H01L 51/12; H01L 63/06; H01L 65/80; H01L 67/104; H01L 67/306; H01L 9/0643; H01L 9/0866; H01L 9/3228; H01L 9/3234; H01L 2209/38; H01L 5/055; H01L 5/0082; H01L 63/0407; H01L 63/08; H01L 63/126; H01L 65/1006; H01L 65/1016; H01L 65/608; H01L 67/02; H01L 67/06; H01L 67/10; H01L 67/16; H01L 67/2814; H01L 12/1822; H01L 1/1854; H01L 1/1861; H01L 2209/16; H01L 43/0876; H01L 43/0894; H01L 51/04; H01L 51/26; H01L 51/28; H01L 51/36; H01L 5/00; H01L 5/0007; H01L 67/22; H01L 51/32; H01L 51/02; H01L 51/046; H01L 51/20; H01L 67/20; H01L 47/70; H01L 63/10; H01L 63/20; H01L 51/043; H01L 51/10; H01L 51/24; H01L 63/101; H01L 63/107; H01L 65/1069; H01L 65/403; H01L 65/602; H01L 12/1485; H01L 12/1818; H01L 2209/80; H01L 45/308; H01L 51/063; H01L 51/16; H01L 51/22; H01L 63/0838; H01L 63/108; H01L 63/12; H01L 63/123; H01L 65/1059; H01L 63/1433; H01L 29/12066; H01L 43/065; H01L 61/1511; H01L 61/2007; H01L 61/2076; H01L 61/25; H01L 61/2503; H01L 63/0414; H01L 63/1425; H01L 63/1458; H01L 12/1827; H01L 63/02; H01L 63/0227; H01L 63/0281; H01L 63/068; H01L 67/14; H01L 67/42; H01L 29/06; H01L 45/00; H01L 45/306; H01L 9/3239; H01L 2209/42; H01L 12/14; H01L 12/1435; H01L 12/1831; H01L 2209/84; H01L 29/06027; H01L 29/08072; H01L 29/08144; H01L 29/12141; H01L 41/0233; H01L 41/046; H01L 41/0663; H01L 41/0672; H01L 41/0816; H01L 41/0843; H01L 41/0856; H01L 41/0893; H01L 41/0896; H01L 41/14; H01L 41/5006; H01L 41/5025; H01L 41/5041; H01L 41/5054; H01L 41/5058; H01L 43/0811; H01L 9/085; H01L 9/33213; H01L 5/0055
   See application file for complete search history.

(56) References Cited

U.S. PATENT DOCUMENTS

| | | | |
|---|---|---|---|
| 2014/0258547 A1* | 9/2014 | Scavo | H04L 67/141 709/227 |
| 2017/0208060 A1* | 7/2017 | Hanifen | G06F 16/24573 |
| 2018/0374028 A1* | 12/2018 | Johansen | G06Q 10/063118 |
| 2019/0073676 A1* | 3/2019 | Wang | G06Q 40/025 |
| 2019/0294606 A1* | 9/2019 | Riva | G06F 16/285 |

* cited by examiner

FIG.5A

BUSINESS OPERATOR A 700A

| USER ID | MEMBERSHIP CARD IC CHIP INFORMATION | LICENSE NUMBER | DEGREE OF EXCELLENCE | REFERENCE VALUE | RATING | CURRENT MONTH UTILIZATION FEE |
|---|---|---|---|---|---|---|
| 001 | A-01 | X1 | S1(≥R1) | R1 | OK | M1 |
| 002 | A-02 | X2 | S2(<R1) | R1 | NG | M2 |
| ⋮ | ⋮ | ⋮ | ⋮ | ⋮ | ⋮ | ⋮ |

FIG.5B

BUSINESS OPERATOR B 700B

| USER ID | MEMBERSHIP CARD IC CHIP INFORMATION | LICENSE NUMBER | DEGREE OF EXCELLENCE | REFERENCE VALUE | RATING | CURRENT MONTH UTILIZATION FEE |
|---|---|---|---|---|---|---|
| 001 | B-01 | X3 | S3(≥R2) | R2 | OK | M3 |
| 002 | B-02 | X4 | S4(<R2) | R2 | NG | M4 |
| ⋮ | ⋮ | ⋮ | ⋮ | ⋮ | ⋮ | ⋮ |

| VIRTUAL USER ID | | UTILIZATION STATUS | MEMBERSHIP CARD IC CHIP INFORMATION |
|---|---|---|---|
| BUSINESS OPERATOR A | A001 | — | — |
| | A002 | — | — |
| | A003 | — | — |
| BUSINESS OPERATOR B | B001 | IN USE | A-01 |
| | B002 | — | — |

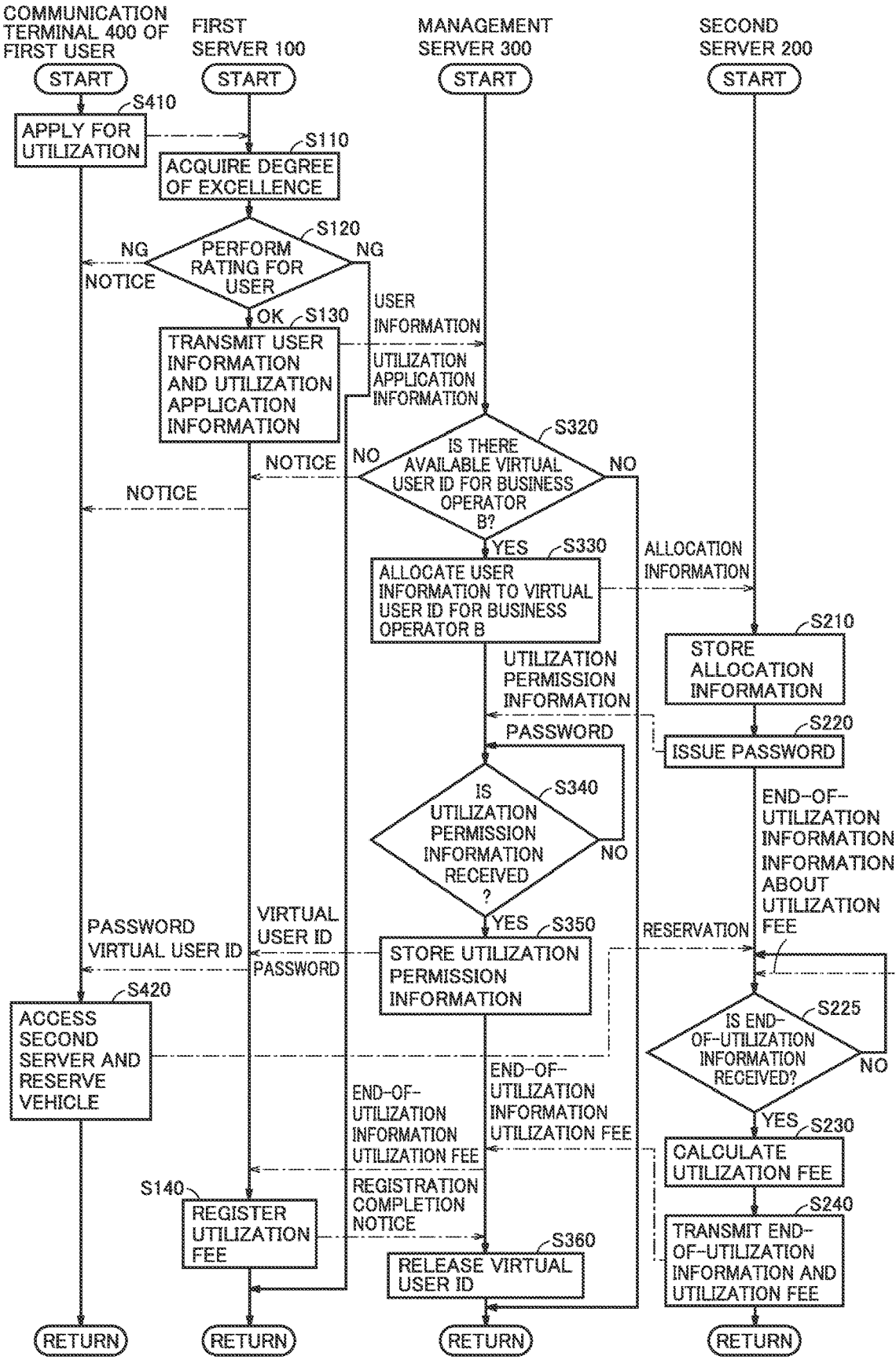

FIG.8

| BUSINESS OPERATOR NAME | DEGREE OF EXCELLENCE | REFERENCE VALUE FOR EACH BUSINESS OPERATOR |
|---|---|---|
| BUSINESS OPERATOR A | S6 | R6 |
| BUSINESS OPERATOR B | S7 | R7 |
| ⋮ | ⋮ | ⋮ |

SHARING SYSTEM, METHOD, AND MANAGEMENT SERVER

This nonprovisional application is based on Japanese Patent Application No. 2017-218343 filed on Nov. 13, 2017 with the Japan Patent Office, the entire contents of which are hereby incorporated by reference.

BACKGROUND

Field

The present disclosure relates to a sharing system for a sharing service.

Description of the Background Art

Sharing allowing a plurality of users to share a single object is increasingly utilized. Car sharing is one example of such sharing. Car sharing means that a user himself/herself does not own a vehicle and instead performs utilization registration (membership registration) with a car sharing business operator and utilizes a vehicle owned by the business operator (hereinafter also referred to as a "share car") as appropriate.

Japanese Patent Laying-Open No. 2017-102553 discloses a vehicle management system which allows vehicles for car sharing and vehicles for rental car service operated by the same business operator to be interchangeably used depending on the reservation statuses of the both types of vehicles and the like. For example, when a user desires to make a reservation for car sharing but cannot do so, the vehicle management system in Japanese Patent Laying-Open No. 2017-102553 determines whether it is possible to make a reservation for a rental car, and when it is possible to do so, the vehicle management system notifies the user that it is possible to make a reservation for a rental car.

SUMMARY

There may be a case where a user who has performed utilization registration with a car sharing business operator and utilizes a car sharing service desires to utilize a share car of another car sharing business operator. Examples of such a case include a case where the user cannot reserve a share car for a desired time slot, and a case where the user is on the go or the like and there is no nearby station where the user can rent a share car.

Although the vehicle management system disclosed in Japanese Patent Laying-Open No. 2017-102553 allows the vehicles to be interchangeably used within one business operator, the number of vehicles which can be interchangeably used in one business operator is limited. In addition, the number of stations in one business operator is also limited. Accordingly, when the business operator does not have a station at a location the user desires to utilize, the business operator cannot provide a vehicle to the user.

If the user then desires to utilize a share car of another car sharing business operator, the user has to perform utilization registration with each other car sharing business operator the user desires to utilize, which is inconvenient for the user.

The present disclosure has been made to solve the aforementioned problem, and an object thereof is to allow a user who utilizes a car sharing service of a business operator to utilize a share car of another car sharing business operator.

A sharing system in accordance with the present disclosure includes: a first server configured to manage a first sharing service; a second server configured to manage a second sharing service provided by a business operator different from a business operator providing the first sharing service; and a management server configured to manage utilization information for allowing a user of the first sharing service who has not performed utilization registration for the second sharing service to utilize the second sharing service. The first server is configured to transmit user information for specifying the user to the management server. Upon receiving the user information, the management server is configured to transmit the utilization information associated with the user information to the second server. The second server is configured to provide the second sharing service to the user specified by the utilization information associated with the user information.

A method in accordance with another aspect of the present disclosure is a method for managing utilization information for allowing a user who has performed utilization registration for a first sharing service to utilize a second sharing service. A business operator providing the second sharing service is different from a business operator providing the first sharing service. The user has not performed utilization registration for the second sharing service. The method includes: receiving user information for specifying the user from a first server configured to manage the first sharing service; transmitting the utilization information associated with the user information to a second server configured to manage the second sharing service; and providing the second sharing service to the user specified by the utilization information associated with the user information.

A method in accordance with still another aspect of the present disclosure is a method for allowing a user who has performed utilization registration for a first sharing service to utilize a second sharing service. A business operator providing the second sharing service is different from a business operator providing the first sharing service. The method includes: receiving, by a first server configured to manage the first sharing service, utilization application information for applying for utilization of the second sharing service; transmitting, by the first server, management information required for utilization of the second sharing service, as a response to the utilization application information; and providing, by a second server configured to manage the second sharing service, the second sharing service using the management information.

A management server in accordance with still another aspect of the present disclosure manages utilization information for allowing a user who has performed utilization registration for a first sharing service to utilize a second sharing service. A business operator providing the second sharing service is different from a business operator providing the first sharing service. The user has not performed utilization registration for the second sharing service. The management server includes: an information acquisition unit configured to receive user information for specifying the user from a first server configured to manage the first sharing service; and an information transmitter configured to transmit the utilization information associated with the user information to a second server configured to manage the second sharing service.

According to the above configuration, once the user has performed utilization registration for the first sharing service, the user can receive the second sharing service provided by the business operator different from the business operator providing the first sharing service. Thereby, the user does not have to perform utilization registration with each sharing business operator, and the user's convenience can be improved.

Preferably, when the first server receives utilization application information for applying for utilization of the second sharing service, the first server transmits the user information to the management server.

According to the above configuration, the user information can be transmitted to the management server only when the first server receives the utilization application information.

Preferably, when the first server receives the utilization application information, the first server transmits the user information to the management server based on a degree of excellence of the user in the first sharing service.

According to the above configuration, when the user of the first sharing service applies for utilization of the second sharing service, the first server transmits the user information to the management server based on the degree of excellence of the user. Thereby, for example by setting to transmit only the user information of a user having a high degree of excellence to the management server, only the user having a high degree of excellence can utilize the second sharing service, which can suppress a user having a low degree of excellence from utilizing the second sharing service.

Preferably, when there is a connection from a communication terminal of the user, the first server refers to a degree of excellence of the user in the first sharing service, and if the degree of excellence is more than a reference value, the first server permits the communication terminal to transmit the utilization application information, and if the degree of excellence is less than the reference value, the first server does not permit the communication terminal to transmit the utilization application information.

According to the above configuration, only a user having a degree of excellence which is more than the reference value is permitted to apply for utilization of the second sharing service. This can avoid a situation where a user applies for utilization of the second sharing service but is not permitted to utilize the second sharing service.

Preferably, the user information includes a degree of excellence of the user in the first sharing service. When the management server receives the user information, the management server refers to the degree of excellence, and if the degree of excellence is more than a reference value set in the management server, the management server transmits the utilization information associated with the user information to the second server.

According to the above configuration, the user information including the degree of excellence of the user is transmitted to the management server. If the degree of excellence is more than the reference value set in the management server, the management server transmits the utilization information associated with the user information to the second server. Thereby, whether or not to transmit the utilization information associated with the user information to the second server can be determined based on the reference value set beforehand in the management server. The basis for the degree of excellence which is different for each business operator can be set to fall within a certain range.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 5A is a diagram showing an example of a configuration of a user list for a business operator A in accordance with the present embodiment.

FIG. 5B is a diagram showing an example of a configuration of a user list for a business operator B in accordance with the present embodiment.

FIG. 6 is a diagram showing an example of a configuration of a virtual user list in accordance with the present embodiment.

FIG. 7 is a flowchart showing processing performed by the car sharing system in accordance with the present embodiment.

FIG. 8 is a diagram showing an example of a degree-of-excellence determination table in a first variation.

DESCRIPTION OF THE PREFERRED EMBODIMENTS

An embodiment of the present disclosure will now be described in detail with reference to the drawings. In the figures, identical or corresponding components are identically denoted and will not be described repeatedly.

(As to Configuration of Car Sharing System 1)

Figure 1:
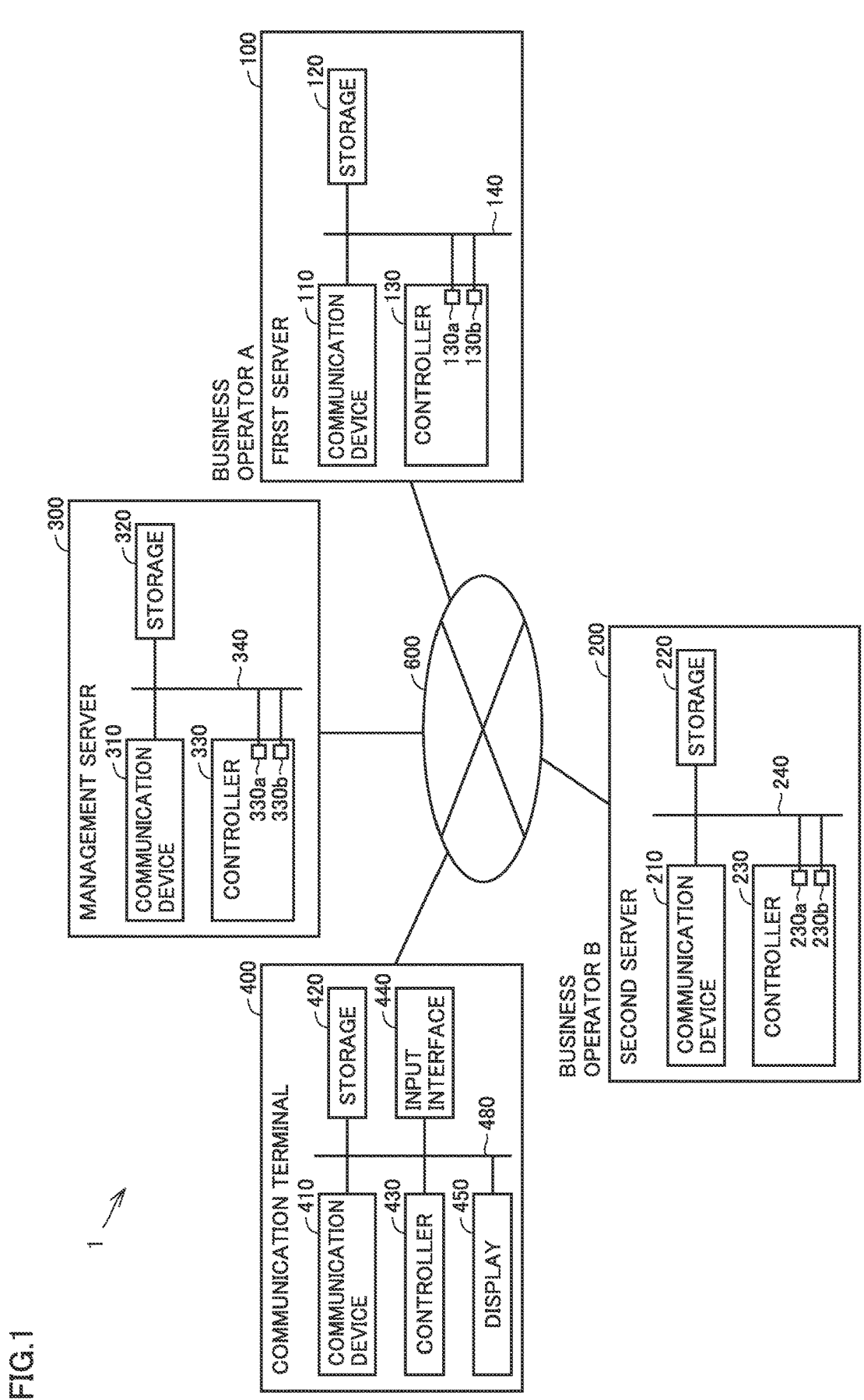
FIG. 1 is a diagram schematically showing an overall configuration of a car sharing system in accordance with the present embodiment.

The present embodiment will describe a case where the sharing system is a car sharing system, as an example of the sharing system. FIG. 1 is a diagram schematically showing an overall configuration of a car sharing system 1 in accordance with the present embodiment. As shown in FIG. 1, car sharing system 1 in accordance with the present embodiment includes a first server 100, a second server 200, a management server 300, and a communication terminal 400.

First server 100 includes a communication device 110, a storage 120, and a controller 130. Each component is communicatively connected by a communication bus 140.

Communication device 110 is configured to be capable of communicating with a communication device 310 of management server 300, a communication device 210 of second server 200, and a communication device 410 of communication terminal 400 (a communication terminal such as a smart phone or a personal computer) of a user. Communications between communication device 110 and communication devices 310, 210, and 410 are performed via a communication network 600 such as the Internet or a telephone line.

Storage 120 includes, for example, a large-capacity storage device such as a hard disk or a solid state drive. Storage 120 stores, for example, user information of each user who has performed utilization registration (membership registration) for a sharing service, a sharing utilization history of each user, a degree of excellence of each user determined based on the sharing utilization history, and the like. Storage 120 also stores a user list 700A described later.

The user information includes, for example, a user ID provided to each user upon performing utilization registration for the sharing service, membership card IC chip information, a license number, and the like. The present embodiment will describe an example where the membership card IC chip information and the license number are used as the user information.

The sharing utilization history includes information indicating actual results of utilization of car sharing, such as the number of times each user has utilized car sharing, the manner of the user during utilization of car sharing, the state of a vehicle returned after car sharing, and the like. Specifically, the sharing utilization history includes, for example, information such as a traveling distance, an accident history, the degree of safe driving determined from the number of times of sudden acceleration and the like, the number of times of cancellation in the last minute, delayed return, garbage left in a returned vehicle, and the like.

The degree of excellence of each user is numerical information calculated by quantifying (grading) each of specific items selected for calculation of the degree of excellence, of the information included in the above sharing utilization history, and adding up the quantified values of the items.

Controller 130 includes a CPU (Central Processing Unit) 130a, a memory (ROM and RAM) 130b, an input/output port (not shown) for inputting/outputting various signals, and the like. Controller 130 is configured to execute predetermined computation processing based on information stored in storage 120, and information received from management server 300 and communication terminal 400 via communication device 110. For example, controller 130 calculates the degree of excellence of each user based on the sharing utilization history, and determines a rating based on the degree of excellence of each user.

In addition, when controller 130 receives from management server 300 allocation information which is information notifying that the user information is allocated to a virtual user ID, controller 130 issues a password, and transmits it to management server 300 and causes storage 120 to store it. The allocation information will be described later.

Second server 200 includes communication device 210, a storage 220, and a controller 230. Each component is communicatively connected by a communication bus 240.

Since the function of each component of second server 200 is the same as the function of each component of first server 100, the description thereof will not be given repeatedly.

Management server 300 includes communication device 310, a storage 320, and a controller 330. Each component is communicatively connected by a communication bus 340.

Communication device 310 is configured to allow communications with communication device 110 of first server 100 and communication device 210 of second server 200. Communications between communication device 310 and communication devices 110 and 210 are performed via communication network 600.

Storage 320 includes, for example, a large-capacity storage device such as a hard disk or a solid state drive. Storage 320 stores, for example, a virtual user list 800 in which virtual user IDs are registered. Each virtual user ID and virtual user list 800 will be described later.

Controller 330 includes a CPU (Central Processing Unit) 330a, a memory (ROM and RAM) 330b, an input/output port (not shown) for inputting/outputting various signals, and the like. Controller 330 is configured to execute predetermined computation processing based on information stored in storage 320, and information received from first server 100 and second server 200 via communication device 310. For example, based on reception of the user information from first server 100, controller 330 allocates the user information to a virtual user ID. Further, based on reception of the user information from second server 200, controller 330 allocates the user information to a virtual user ID. The detail will be described later.

Communication terminal 400 includes communication device 410, a storage 420, a controller 430, an input interface 440, and a display 450. Each component is communicatively connected by a communication bus 480.

Communication device 410 is configured to allow communications with communication device 110 of first server 100 and communication device 210 of second server 200. Communications between communication device 410 and communication devices 110 and 210 are performed via communication network 600.

Storage 420 includes, for example, a large-capacity storage device such as a flash memory, a hard disk, or a solid state drive. Storage 420 stores the virtual user ID to which the user information is allocated, the password issued by first server 100 or second server 200, and the like.

Controller 430 is configured to execute predetermined computation processing based on, for example, information stored in storage 420, information received from first server 100 via communication device 410, and the like.

Input interface 440 is an input device in communication terminal 400. Input interface 440 is composed of a keyboard, a mouse, a touch panel, and the like, and accepts input operations done via the keyboard, the mouse, the touch panel, and the like.

Display 450 is a display device controlled by controller 430 to display an image. Display 450 is implemented for example as a liquid crystal panel or the like.

Figure 2:
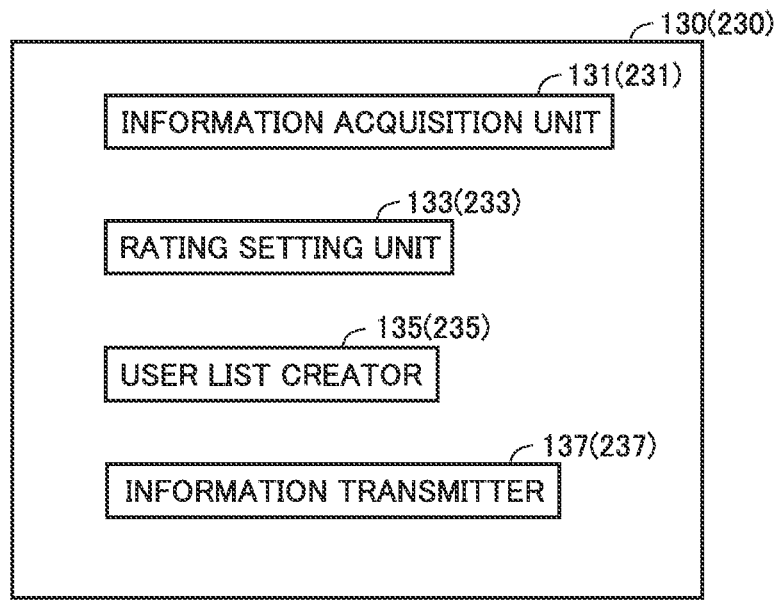
FIG. 2 is a functional block diagram showing a configuration of a controller of a first server (a second server) in accordance with the present embodiment.

FIG. 2 is a functional block diagram showing a configuration of controller 130 (230) of first server 100 (second server 200) in accordance with the present embodiment. Controller 130 includes an information acquisition unit 131, a rating setting unit 133, a user list creator 135, and an information transmitter 137.

Information acquisition unit 131 acquires information about utilization registration, information about reservation for car sharing, utilization application information for applying for utilization of a share car of another car sharing business operator, and the like input from communication terminal 400 of a user, via communication device 110. Further, information acquisition unit 131 acquires information about a virtual user ID from management server 300, via communication device 110.

Rating setting unit 133 sets information used for rating the user, of the information included in the sharing utilization history. Rating setting unit 133 uses the set information included in the sharing utilization history to quantify the degree of excellence of the user.

User list creator 135 creates user list 700A described later based on the user information, the degree of excellence of the user quantified by rating setting unit 133, and the like, and causes storage 120 to store user list 700A.

Information transmitter 137 transmits the user information and the utilization application information for applying for utilization of a share car of the other car sharing business operator to management server 300, via communication device 110. Information transmitter 137 transmits the information about the virtual user ID to which the user information is allocated, acquired from management server 300, to communication terminal 400 of the user, via communication device 110. Further, information transmitter 137 transmits a password issued for the virtual user ID, to management server 300.

Controller 230 of second server 200 in accordance with the present embodiment includes an information acquisition unit 231, a rating setting unit 233, a user list creator 235, and an information transmitter 237. Since the function of controller 230 of second server 200 is the same as the function of controller 130 of first server 100, the description thereof will not be given repeatedly.

Figure 3:
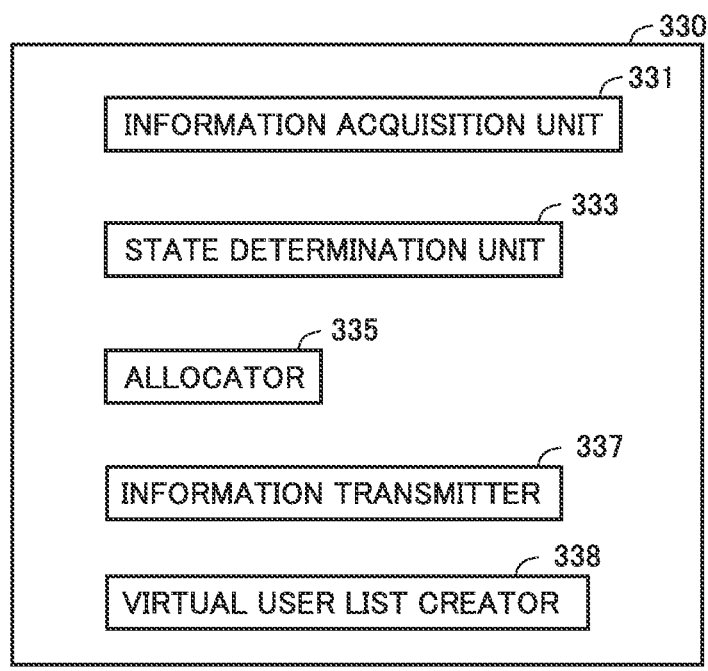
FIG. 3 is a functional block diagram showing a configuration of a controller of a management server in accordance with the present embodiment.

FIG. 3 is a functional block diagram showing a configuration of controller 330 of management server 300 in accordance with the present embodiment. Controller 330 includes an information acquisition unit 331, a state determination unit 333, an allocator 335, an information transmitter 337, and a virtual user list creator 338.

Information acquisition unit 331 acquires the utilization application information and the user information from first server 100 or second server 200, via communication device 310. Further, information acquisition unit 331 acquires utilization permission information from first server 100 or second server 200, via communication device 310. The utilization permission information is information for permitting utilization of a car sharing service using a virtual user ID, in response to utilization application from a user who has performed utilization registration with another car sharing business operator.

When the utilization application information is received from first server 100 or second server 200 via communication device 310, state determination unit 333 determines whether there is an available virtual user ID. When there is an available virtual user ID, state determination unit 333 notifies allocator 335 that there is an available virtual user ID. When there is no available virtual user ID, state determination unit 333 notifies information transmitter 337 that there is no available virtual user ID.

When allocator 335 receives from state determination unit 333 a notice that there is an available virtual user ID, allocator 335 allocates the user information received together with the utilization application information to the virtual user ID. Specifically, in the present embodiment, allocator 335 allocates the membership card IC chip information included in the user information to the virtual user ID.

Information transmitter 337 transmits the allocation information which is information notifying that the user information is allocated to the virtual user ID, to first server 100 or second server 200. The allocation information is information including the user information allocated to the virtual user ID. In addition, when information transmitter 337 receives from state determination unit 333 a notice that there is no available virtual user ID, information transmitter 337 notifies first server 100 or second server 200 that there is no available virtual user ID. It should be noted that information transmitter 337 may transmit information including the virtual user ID to which the user information is allocated, as the allocation information, to first server 100 or second server 200, via communication device 310.

Virtual user list creator 338 creates virtual user list 800 described later, and causes storage 320 to store virtual user list 800.

(As to Car Sharing)

Generally, in a car sharing system, a user performs utilization registration (membership registration) with one business operator providing a sharing service. Then, the user uses his or her communication terminal to connect to a server managing a car sharing service of the business operator and reserve a vehicle (share car). Then, the user rents the share car at a station where share cars are rented and returned, at a reserved time, for example. Then, after using the share car, the user returns the share car to the station where the user has rented the share car, or another station.

In recent years, as such car sharing systems are increasingly utilized, there may be a case where a user cannot reserve a share car for a desired time slot or location. In such a case, the user may desire to utilize a car sharing system of another business operator if the other business operator has an available share car.

However, to utilize the car sharing system of the other business operator, the user has to perform utilization registration (membership registration) with the other business operator the user desires to utilize. Accordingly, if the user desires to utilize car sharing services of a plurality of other business operators, the user has to perform utilization registration with each of the other business operators, which is inconvenient for the user.

Thus, there is a demand for a system in which, when a user registers with one business operator providing a car sharing service, the user is allowed, through the business operator, to utilize a car sharing service provided by another business operator.

Car sharing system 1 in accordance with the present embodiment includes first server 100 configured to manage a first sharing service, second server 200 configured to manage a second sharing service, and management server 300 configured to manage virtual user IDs.

When a user has performed utilization registration for the first sharing service only, the user notifies first server 100 with which the user has performed utilization registration, of the utilization application information for applying for utilization of the second sharing service operated by another business operator, from communication terminal 400. First server 100 which has received the utilization application information transmits the user information to management server 300. Management server 300 which has received the user information allocates the user information to a virtual user ID. Management server 300 notifies second server 200 of the allocation information which is information notifying that allocation is performed. Second server 200 provides the second sharing service using the virtual user ID to which the user information is allocated.

Thereby, once the user has performed utilization registration for a sharing service of one sharing business operator, the user can receive sharing services of a plurality of other sharing business operators. Therefore, the user does not have to perform utilization registration with each of the sharing business operators, and the user's convenience can be improved.

In the present embodiment, a description will be given on an assumption that the first sharing service is a car sharing service operated by a business operator A, and the second sharing service is a car sharing service operated by a business operator B. In the following, a description will be given of an example where a user who has performed utilization registration for the car sharing service of business operator A but has not performed utilization registration for the car sharing service of business operator B (hereinafter also referred to as a "first user") utilizes the car sharing service of business operator B. It should be noted that a user who has performed utilization registration for the car sharing service of business operator B but has not performed utilization registration for the car sharing service of business operator A is also referred to as a "second user".

Figure 4:
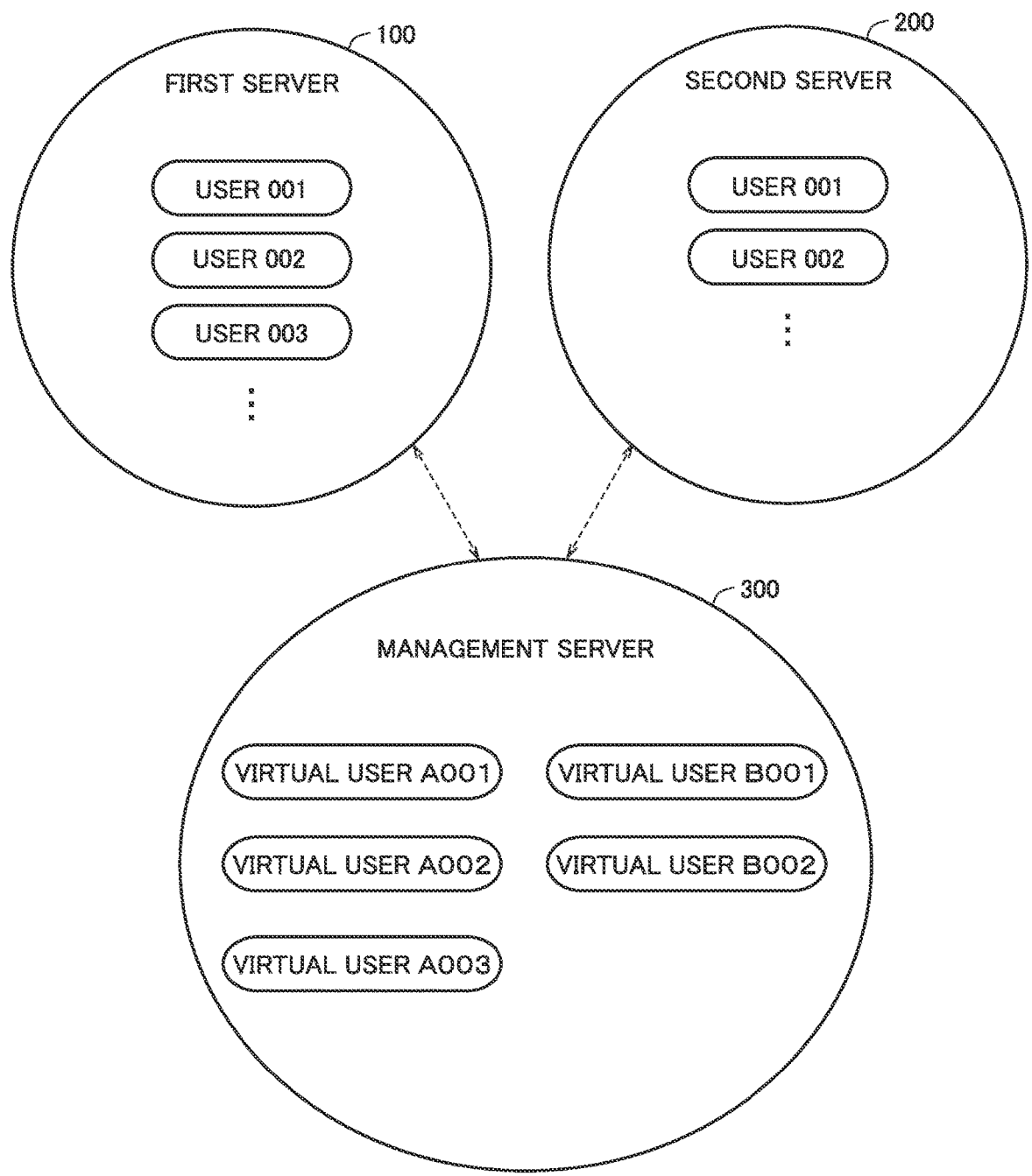
FIG. 4 is a conceptual diagram of the car sharing system in accordance with the present embodiment.

FIG. 4 is a conceptual diagram of car sharing system 1 in accordance with the present embodiment. FIG. 4 shows first server 100, second server 200, and management server 300.

In first server 100 configured to manage the car sharing service of business operator A (the first sharing service), a user ID is assigned to each user who has performed utilization registration for the first sharing service, and is registered. Each user ID is associated with another user information and the like, is registered in user list 700A described later, and is stored in storage 120.

In second server 200 configured to manage the car sharing service of business operator B (the second sharing service), a user ID is assigned to each user who has performed utilization registration for the second sharing service, and is registered. Each user ID is associated with another user information and the like, is registered in a user list 700B described later, and is stored in storage 220.

In management server 300 configured to manage the virtual user IDs, virtual user IDs A001, A002, and A003 for business operator A prepared by business operator A are managed. In addition, virtual user IDs B001 and B002 for business operator B prepared by business operator B are managed. Management server 300 registers these virtual user IDs together with utilization statuses in virtual user list 800 described later, and stores them in storage 320.

A virtual user ID for business operator A is a virtual user ID for temporarily providing the first sharing service of business operator A to the user who has performed utilization registration with business operator B but has not performed utilization registration with business operator A (the second user).

A virtual user ID for business operator B is a virtual user ID for temporarily providing the second sharing service of business operator B to the user who has performed utilization registration with business operator A but has not performed utilization registration with business operator B (the first user).

For example, when the first user utilizes the second sharing service, virtual user ID B001 or B002 for business operator B is temporarily assigned to the first user. Then, the first user uses virtual user ID B001 or B002 to connect to second server 200 and receive the second sharing service.

(User Lists 700A and 700B)

User lists 700A and 700B will now be specifically described with reference to FIG. 5A and FIG. 5B. FIG. 5A and FIG. 5B show exemplary configurations of user lists 700A and 700B in accordance with the present embodiment.

FIG. 5A shows an example of user list 700A for business operator A. As shown in FIG. 5A, in the present embodiment, a user ID, membership card IC chip information, a license number, a degree of excellence, a reference value, a rating, and a current month utilization fee are registered in user list 700A.

The user ID is issued to a user when the user completes utilization registration for the first sharing service of business operator A, and is used to specify the user within business operator A.

The membership card IC chip information is information for identifying a membership card issued to the user upon completion of utilization registration for the first sharing service of business operator A. The membership card IC chip information is used to uniquely specify the user among business operators, for example, between business operator A and business operator B.

The license number is the number of the user's license presented when the user performs utilization registration for the first sharing service of business operator A. The license number may be used as information for uniquely specifying the user among business operators, instead of the membership card IC chip information.

The degree of excellence is numerical information calculated by quantifying the degree of excellence of the user based on the sharing utilization history, as described above.

The reference value is a value serving as a basis for determining whether or not the user is an excellent user. The reference value is a value suitably set in business operator A.

The rating indicates whether or not the user is an excellent user, and "OK" or "NG" is indicated. Specifically, "OK" is registered when the degree of excellence is more than or equal to the reference value, and "NG" is registered when the degree of excellence is less than the reference value.

As the current month utilization fee, a fee calculated by adding a fee incurred due to the first user's utilization of the first sharing service of business operator A and a fee incurred due to the first user's utilization of the second sharing service of business operator B is registered.

For a first user having a user ID 001, membership card IC chip information A-01, a license number X1, a degree of excellence S1, a reference value R1, a rating result OK, and a current month utilization fee M1 are registered. Since the user having user ID 001 has the degree of excellence S1 which is more than or equal to reference value R1 (S1≥R1), the user's rating is registered as "OK".

For a first user having a user ID 002, membership card IC chip information A-02, a license number X2, a degree of excellence S2, reference value R1, a rating result NG, and a current month utilization fee M2 are registered. Since the user having user ID 002 has the degree of excellence S2 which is less than reference value R1 (S2<R1), the user's rating is registered as "NG".

FIG. 5B shows an example of user list 700B for business operator B. In the present embodiment, a user ID, membership card IC chip information, a license number, a degree of excellence, a reference value, a rating, and a current month utilization fee are registered in user list 700B, as in user list 700A.

For a second user having a user ID 001, membership card IC chip information B-01, a license number X3, a degree of excellence S3, a reference value R2, a rating result OK, and a current month utilization fee M3 are registered. Since the user having user ID 001 has the degree of excellence S3 which is more than or equal to reference value R2 (S3≥R2), the user's rating is registered as "OK".

For a second user having a user ID 002, membership card IC chip information B-02, a license number X4, a degree of excellence S4, reference value R2, a rating result NG, and a current month utilization fee M4 are registered. Since the user having user ID 002 has the degree of excellence S4 which is less than reference value R2 (S4<R2), the user's rating is registered as "NG".

It should be noted that, although an example has been described where different reference values R1 and R2 are used in business operators A and B as a reference value for rating, the same reference value may be used. Generally, different reference values may be adopted because the items in the sharing utilization history used to determine the degree of excellence in each business operator may be different. However, it is desirable that the degree of excellence of a user determined to have a rating of OK in each business operator is comparable.

(Virtual User List 800)

FIG. 6 is a diagram showing an example of a configuration of virtual user list 800 in accordance with the present embodiment. In virtual user list 800, virtual user IDs, utilization statuses, and membership card IC chip information are registered.

The virtual user IDs are the virtual user IDs for business operator A prepared by business operator A and the virtual user IDs for business operator B prepared by business operator B described above. Specifically, A001, A002, and A003 are registered as the virtual user IDs for business operator A prepared by business operator A, and B001 and B002 are registered as the virtual user IDs for business operator B prepared by business operator B.

Each utilization status indicates whether or not each virtual user ID is used. In FIG. 6, "-" indicates that the virtual user ID is available. In FIG. 6, the utilization status of virtual user ID B001 is indicated as "IN USE", indicating that virtual user ID B001 is in use.

The membership card IC chip information is used to specify a user who is using a virtual user ID at present. The example shown in FIG. 6 shows that the first user having membership card IC chip information A-01 is using virtual user ID B001.

It should be noted that, although the present embodiment has described an example where the membership card IC chip information is used as information for specifying a user in management server 300, it is only necessary that a user can be uniquely specified. For example, a license number may be used as information for specifying a user.

(Processing Performed by Car Sharing System)

FIG. 7 is a flowchart showing processing performed by car sharing system 1 in accordance with the present embodiment. It should be noted that, although each step shown in the flowchart shown in FIG. 7 is implemented by software processing performed by first server 100, second server 200, management server 300, and communication terminal 400, a part thereof may be implemented by hardware (electric circuitry) fabricated within first server 100, second server 200, management server 300, and communication terminal 400.

FIG. 7 shows, from the left in the drawing, processing performed by communication terminal 400 of the first user, processing performed by first server 100, processing performed by management server 300, and processing performed by second server 200. A series of processing shown in FIG. 7 is performed whenever utilization application for the second sharing service of business operator B is made to first server 100 from communication terminal 400 of the first user.

When communication terminal 400 of the first user receives an input from the first user that the first user desires to utilize the second sharing service, communication terminal 400 transmits utilization application information for the second sharing service to first server 100 (step 410; hereinafter each step will be abbreviated as "S").

When first server 100 receives the utilization application information for the second sharing service from communication terminal 400, first server 100 reads user list 700A from storage 120 to acquire the degree of excellence of the first user (S110). Then, first server 100 makes determination on the degree of excellence of the first user (S120). First server 100 registers a determined result of the degree of excellence in a column "RATING" of user list 700A. When first server 100 determines that the degree of excellence is less than a reference value (NG in S120), first server 100 terminates the processing. In addition, when first server 100 determines that the degree of excellence is less than the reference value (NG in S120), first server 100 notifies communication terminal 400 that the first user cannot utilize the second sharing service. This can suppress the first user having a low degree of excellence from utilizing the second sharing service.

When first server 100 determines that the degree of excellence is more than or equal to the reference value (OK in S120), first server 100 transmits user information for specifying the first user and the utilization application information to management server 300 (S130).

When management server 300 receives the user information and the utilization application information from first server 100, management server 300 refers to virtual user list 800 and determines whether or not there is an available virtual user ID for business operator B (S320). When management server 300 determines that there is no available virtual user ID for business operator B, management server 300 notifies first server 100 that there is no available virtual user ID for business operator B, and terminates the processing (NO in S320).

When first server 100 receives a notice from management server 300 that there is no available virtual user ID for business operator B, first server 100 notifies communication terminal 400 that there is no available virtual user ID for business operator B.

When management server 300 determines that there is an available virtual user ID for business operator B (YES in S320), management server 300 allocates the user information to the virtual user ID for business operator B, and updates virtual user list 800 (S330). Specifically, management server 300 registers membership card IC chip information of the first user in a column "MEMBERSHIP CARD IC CHIP INFORMATION" of virtual user list 800, and changes the utilization status to "IN USE". Management server 300 notifies second server 200 of allocation information including the user information allocated to the virtual user ID for business operator B (S330). It should be noted that, although the allocation information is information notifying that the user information is allocated to the virtual user ID in the present embodiment, the allocation information may be information including the virtual user ID to which the user information is allocated. The allocation information corresponds to the "utilization information associated with the user information" in the present disclosure.

When second server 200 receives the allocation information from management server 300, second server 200 stores the received allocation information in storage 220 (S210). When second server 200 stores the received allocation information in storage 220, second server 200 sets and issues a password (S220). Then, second server 200 transmits the password and utilization permission information for permitting utilization of the virtual user ID to which the user information is allocated, to management server 300 (S220).

Management server 300 waits until it receives the utilization permission information from second server 200 (NO in S340). When management server 300 receives the utilization permission information and the password (YES in S340), management server 300 stores the utilization permission information in storage 320, and transmits the virtual user ID and the password to first server 100 (S350). It should be noted that, although virtual user list 800 is updated in S330 in the present embodiment, virtual user list 800 may be updated in S350.

When first server 100 receives the virtual user ID and the password from management server 300, first server 100 transmits the virtual user ID and the password to communication terminal 400. It should be noted that the virtual user ID and the password correspond to the "management information" in the present disclosure.

When communication terminal 400 receives the virtual user ID and the password from first server 100, communication terminal 400 uses the received virtual user ID and password to access second server 200 and reserve a share car (S420).

Second server 200 permits reservation for the share car using the virtual user ID to which utilization permission is given, and provides the second sharing service.

Second server 200 waits until it receives end-of-utilization information of the share car reserved in S420 and information about a utilization fee for the share car (NO in S225). The information about the utilization fee for the share car is information about the utilization fee for the share car of business operator B used by the first user, such as a traveling distance, a utilization time, a used power amount in the case of an electric vehicle, and the like, for example. Second server 200 acquires the end-of-utilization information and the information about the utilization fee from the share car subjected to end-of-utilization processing, for example.

When second server 200 receives the end-of-utilization information and the information about the utilization fee for the share car (YES in S225), second server 200 calculates the utilization fee from the information about the utilization fee for the share car (S230). Second server 200 transmits the end-of-utilization information and the utilization fee to management server 300 (S240). When management server 300 receives the end-of-utilization information and the utilization fee from second server 200, management server 300 transmits the end-of-utilization information and the utilization fee to first server 100.

When first server 100 registers the utilization fee in user list 700A, first server 100 transmits a registration completion notice to management server 300 (S140).

When management server 300 receives the registration completion notice from first server 100, management server 300 releases the virtual user ID (S360). This allows the next first user to use the virtual user ID.

As described above, in car sharing system 1 in accordance with the present embodiment, the first user transmits, from communication terminal 400 to first server 100 for business operator A with which the first user has performed utilization registration, the utilization application information for applying for utilization of the second sharing service operated by business operator B with which the first user has not performed utilization registration.

First server 100 which has received the utilization application information transmits the user information and the utilization application information to management server 300. Management server 300 which has received the user information and the utilization application information allocates the user information to a virtual user ID. Management server 300 notifies second server 200 of the allocation information which is information notifying that allocation is performed. Second server 200 provides the second sharing service using the virtual user ID to which the user information is allocated.

Thus, the first user can utilize a sharing service of a car sharing business operator with which the first user has not performed utilization registration, without performing utilization registration with each car sharing business operator, and the first user's convenience is improved.

It should be noted that, although the description has been given of the example where the first user utilizes the second car sharing service of business operator B with which the first user has not performed utilization registration, the same applies to a case where the second user who has performed utilization registration for the car sharing service of business operator B but has not performed utilization registration for the car sharing service of business operator A utilizes the car sharing service of business operator A.

Further, although the present embodiment has described an example where share cars are mutually utilized between business operator A operating the first sharing service and business operator B operating the second sharing service, the present disclosure is also applicable to a plurality of three or more business operators.

For example, in a case where share cars are mutually utilized among three business operators further including a business operator C, virtual user IDs for business operator C prepared by business operator C are further managed in management server 300. The share cars are mutually utilized among the three business operators, using the virtual user IDs for business operator A, the virtual user IDs for business operator B, and the virtual user IDs for business operator C.

Thereby, once the user has performed utilization registration for a sharing service of one sharing business operator, the user can receive sharing services of a plurality of other sharing business operators. Therefore, the user does not have to perform utilization registration with each of the sharing business operators, and the user's convenience can be improved.

Further, although the present embodiment has described an example where each of business operator A and business operator B prepares its own virtual user IDs in management server 300, business operator A and business operator B may use virtual user IDs prepared in common in management server 300. The same applies to a plurality of three or more business operators.

Further, although the present embodiment has described the example of car sharing as an example of sharing, the present disclosure is applicable to sharing as a whole. For example, the present disclosure is applicable to sharing of bicycles, sharing of CDs (Compact Discs), DVDs, and the like, sharing of furniture, sharing of locations, and the like.

<First Variation>

Although rating for a user is performed in first server 100 in the present embodiment, it is only necessary that rating for a user can be performed. For example, the user information includes the degree of excellence of a user, and is transmitted from first server 100 to management server 300. Management server 300 may perform rating using a degree-of-excellence determination table stored beforehand in storage 320.

FIG. 8 is a diagram showing an example of the degree-of-excellence determination table in a first variation. In the degree-of-excellence determination table, a business operator name, the degree of excellence, and a reference value for each business operator are registered. The reference value for each business operator is individually set beforehand for each business operator. When the degree of excellence is more than or equal to the reference value, the user is determined to have a rating of OK, and the user information is allocated to a virtual user ID. The reference value for each business operator is set for each business operator such that, when the degree of excellence calculated in each business operator is rated, the degree of excellence of a user determined to have a rating of OK in each business operator is comparable.

When management server 300 receives the user information and the utilization application information, management server 300 specifies a business operator from information of a transmission source. Then, management server 300 performs rating by checking the specified business operator and the degree of excellence included in the user information against the degree-of-excellence determination table.

Thereby, whether or not to allocate the user information to a virtual user ID can be determined based on the reference value set beforehand in management server 300. Accordingly, the basis for the degree of excellence which is different for each business operator can be set to fall within a certain range.

<Second Variation>

Although rating for the first user is performed after the user applies for utilization of the second sharing service in the present embodiment, it is only necessary that rating for the first user can be performed. For example, when the first user accesses first server 100, first server 100 performs rating for the first user using the degree of excellence.

When the degree of excellence is more than or equal to a reference value, first server 100 determines that the user has a rating of OK, and displays a screen for applying for utilization of the second sharing service on display 450 of communication terminal 400 of the first user. On the other hand, when the degree of excellence is less than the reference value, first server 100 determines that the user has a rating of NG, and displays only a screen for utilizing the first sharing service on display 450 of communication terminal 400 of the first user.

Thereby, only the first user having a degree of excellence which is more than or equal to the reference value is permitted to apply for utilization of the second sharing service. This can avoid a situation where the first user applies for utilization of the second sharing service but is not permitted to utilize the second sharing service.

It should be noted that, also when the degree of excellence is less than the reference value, the screen for applying for utilization of the second sharing service may be displayed on display 450 of communication terminal 400 of the first user, but the screen may be configured such that an operation for applying for utilization of the second sharing service cannot be performed thereon.

Although the embodiment of the present disclosure has been described, it should be understood that the embodiment disclosed herein is illustrative and non-restrictive in every respect. The scope of the present disclosure is defined by the scope of the claims, and is intended to include any modifications within the scope and meaning equivalent to the scope of the claims.

What is claimed is:

1. A sharing system comprising:
 a first server configured to manage a first sharing service;
 a second server configured to manage a second sharing service provided by a business operator different from a business operator providing the first sharing service; and
 a management server configured to manage utilization information for allowing a user of the first sharing service who has not performed utilization registration for the second sharing service to utilize the second sharing service, wherein
 the utilization information includes at least one virtual user ID for allowing the second sharing service,
 the first sharing service and the second sharing service being services for allowing a plurality of users to share a single object or location,
 the first server being configured to transmit user information for specifying the user to the management server when the user of the first sharing service applies to the first server to use the second sharing service,
 if there is an available virtual user ID upon receiving the user information, the management server being configured to
   allocate the user information to the virtual user ID after receiving the user information, associate the user information with the utilization information, and
   transmit the allocated user information to the virtual user ID to the second server,
 the second server being configured to provide the second sharing service using the virtual user ID to which the user information is allocated to the user specified by the utilization information associated with the user information.

2. The sharing system according to claim 1, wherein, when the first server receives utilization application information for applying for utilization of the second sharing service, the first server transmits the user information to the management server.

3. The sharing system according to claim 2, wherein when the first server receives the utilization application information, the first server transmits the user information to the management server based on a degree of excellence of the user in the first sharing service, and
 the degree of excellence is determined using a utilization history of the first sharing service.

4. The sharing system according to claim 2, wherein when there is a connection from a communication terminal of the user, the first server refers to a degree of excellence of the user in the first sharing service,
 if the degree of excellence is more than a reference value, the first server permits the communication terminal to transmit the utilization application information, and
 if the degree of excellence is less than the reference value, the first server does not permit the communication terminal to transmit the utilization application information, and
 the degree of excellence is determined using a utilization history of the first sharing service.

5. The sharing system according to claim 1, wherein the user information includes a degree of excellence of the user in the first sharing service,
 when the management server receives the user information, the management server refers to the degree of excellence, and
 if the degree of excellence is more than a reference value set in the management server, the management server transmits the utilization information associated with the user information to the second server, and
 the degree of excellence is determined using a utilization history of the first sharing service.

6. A method for managing utilization information for allowing a user who has performed utilization registration for a first sharing service to utilize a second sharing service,
 the first sharing service and the second sharing service being services for allowing a plurality of users to share a single object or location,
 a business operator providing the second sharing service being different from a business operator providing the first sharing service,
 the user having not performed utilization registration for the second sharing service and applying to use the second sharing service,
 the method comprising:
 receiving user information for specifying the user from a first server configured to manage the first sharing service, the utilization information including at least one virtual user ID for allowing the second sharing service;

if there is an available virtual user ID upon receiving the user information, allocating the user information to the virtual user ID after receiving the user information and associating the user information with the utilization information;

transmitting the allocated user information to the virtual user ID to a second server configured to manage the second sharing service; and providing the second sharing service using the virtual user ID to which the user information is allocated to the user specified by the utilization information associated with the user information.

7. A method for allowing a user who has performed utilization registration for a first sharing service to utilize a second sharing service, the first sharing service and the second sharing service being services for allowing a plurality of users to share a single object or location, a business operator providing the second sharing service being different from a business operator providing the first sharing service, the method comprising:

receiving, by a first server configured to manage the first sharing service, utilization application information for applying for utilization of the second sharing service, the utilization application information including at least one virtual user ID for allowing the second sharing service;

transmitting user information specifying the user to a management server when the user of the first sharing service applies to the first server to use the second sharing service;

if there is an available virtual user ID upon receiving the user information, allocating the user information to the virtual user ID after receiving the user information and associating the user information with the utilization application information;

transmitting, by the first server, management information used for utilization of the second sharing service, as a response to the utilization application information; and providing, by a second server configured to manage the second sharing service, the second sharing service using the virtual user ID to which the user information is allocated.

8. A management server for managing utilization information for allowing a user who has performed utilization registration for a first sharing service to utilize a second sharing service, the first sharing service and the second sharing service being services for allowing a plurality of users to share a single object or location, a business operator providing the second sharing service being different from a business operator providing the first sharing service, the user having not performed utilization registration for the second sharing service and applying to use the second sharing service, the management server comprising:

an information acquisition unit configured to receive user information for specifying the user from a first server configured to manage the first sharing service, the utilization information includes at least one virtual user ID for allowing the second sharing service, and, if there is an available virtual user ID upon receiving the user information, allocating the user information to the virtual user ID after receiving the user information and associating the user information with the utilization information; and an information transmitter configured to transmit the allocated user information to the virtual user ID to a second server configured to manage the second sharing service, wherein the second server is configured to provide the second sharing service using the virtual user ID to which the user information is allocated to the user specified by the utilization information associated with the user information.

* * * * *